(12) United States Patent
Sarangapani et al.

(10) Patent No.: US 6,203,692 B1
(45) Date of Patent: Mar. 20, 2001

(54) ELECTROCHEMICAL PURIFICATION OF CHLORINE

(76) Inventors: Srinivasan Sarangapani, 17 Rose Marie La., Walpole, MA (US) 02081; Tilak Bommaraju, 68 Dolphin Dr., Grand Island, NY (US) 14072

( * ) Notice: Subject to any disclaimer, the term of this patent is extended or adjusted under 35 U.S.C. 154(b) by 0 days.

(21) Appl. No.: 09/590,456

(22) Filed: Jun. 9, 2000

Related U.S. Application Data

(60) Provisional application No. 60/138,364, filed on Jun. 10, 1999.

(51) Int. Cl.$^7$ .......................................................... C25B 1/00
(52) U.S. Cl. .......................... 205/763; 205/765; 205/536; 204/263; 204/265; 204/266
(58) Field of Search ..................................... 205/536, 763, 205/765; 204/265, 266, 263

(56) References Cited

U.S. PATENT DOCUMENTS 5,618,405 * 4/1997 Winnick ................................ 205/763

* cited by examiner

Primary Examiner—Arun S. Phasge

(57) ABSTRACT

A process for separating chlorine gas from a mixture with other gases is disclosed. In the process, chlorine gas, either as an impure gas or as dissolved gas in hydrochloric acid, is reduced at the cathode of an electrochemical cell to form chloride ions, which are discharged at the anode of the same cell as pure chlorine gas. An apparatus for performing the process is also disclosed.

20 Claims, 4 Drawing Sheets

ELECTROCHEMICAL PURIFICATION OF CHLORINE

This application claims priority based on provisional application Serial No. 60/138,364, filed Jun. 10, 1999.

BACKGROUND OF THE INVENTION

This invention relates to the electrochemical separation of chlorine gas from a mixture with other gases. In particular, it relates to the electrochemical separation of chlorine gas from the tail gas streams of chlor-alkali plants.

In a chlor-alkali plant, chlorine is generated by electrolysis of an aqueous sodium chloride solution. The chlorine is saturated with brine water vapor at ~95° C. at pressures ranging from slightly negative or positive to, in some membrane cell plants, up to several hundred kilopascals. In the diaphragm process, the chlorine gas stream also carries along droplets of sodium sulfate and salt.

After drying the chlorine using concentrated (96–98 wt %) sulfuric acid, the chlorine gas is passed through demisters to remove sulfuric acid mist. To avoid the formation of chlorine hydrate crystals, the chlorine is first cooled to usually not less than 10° C. Cooling is carried out indirectly in tubular titanium heat exchangers in one or two stages using chilled water on the coolest stage. Water and remaining solids are removed in eitherwet Brinks demisters, which have special filter elements containing glass wool fibers, or in electrostatic precipitators. The cooled, dry chlorine gas is scrubbed with liquid chlorine to pre-cool it prior to compression. About half of the chlorine produced is used as cooled dry gas, which is transported by pipelines to the consuming process; the remainder is liquefied, stored, and shipped.

The tail gas (also called as vent or sniff gas) from the liquefaction process contains gases such as $Cl_2$, $O_2$, $N_2$, $CO_2$, and $H_2$—the exact composition being dependent on the cell current efficiency and other process variables. It is essential that the $Cl_2$ in the tail gas be recovered, as it cannot be vented due to air quality regulations.

There are several technologies available to recover the $Cl_2$ from this tail gas. Some of these technologies involve selectively absorbing the chlorine in water, carbon tetrachloride, or onto solid absorbents. The chlorine can also be reacted with sulfur to produce sulfur monochloride, hydrogen to produce HCl, or water to produce chlorine hydrate. Permselective membranes can separate the chlorine from the other gases. However, these technologies all have problems, ranging from the use of an ozone depleter ($CCl_4$), to high capital costs, corrosion of equipment, poor efficiency, and inability to remove $CO_2$ from the chlorine. At present, no viable, energy efficient technology is available to recover chlorine, and new plants are often designed to neutralize chlorine from the tail gas with caustic and dispose off the effluent.

SUMMARY OF THE INVENTION

We have discovered that chlorine gas can be electrochemically separated from a mixture with other gases. In this invention, only chlorine from the impure mixture is reduced at the cathode of an electrolytic cell to form chloride. The resulting chloride is fed to the anode where pure chlorine gas discharges.

Unlike some other technologies for separating chlorine, this method does not waste chlorine. This method also consumes less energy, minimizes waste gas streams, and generates nearly 100% pure chlorine.

DESCRIPTION OF THE PREFERRED EMBODIMENTS

Figure 1:
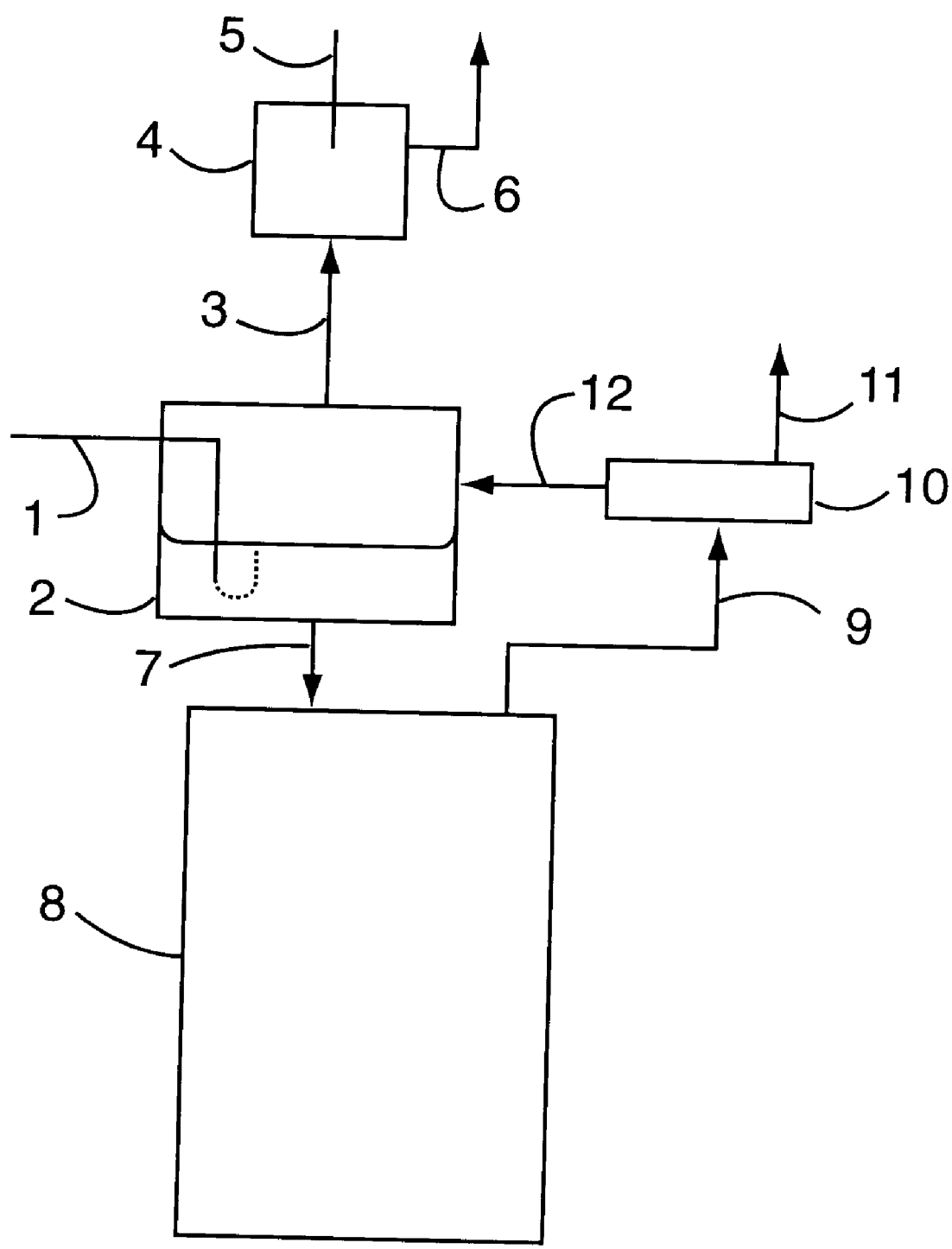
FIG. 1 is a block diagram illustrating a presently-preferred embodiment of a process of this invention for electrochemically recovering chlorine from tail gas.

In FIG. 1, a mixture of gases in line 1 containing chlorine gas and typically hydrogen, oxygen, nitrogen, and carbon dioxide, enters chlorine absorber 2, where it is mixed with hydrochloric acid, forming a solution of the chlorine gas in the hydrochloric acid. Most of the remaining gases in the mixture of gases passes through line 3 to scrubber 4, where they are sprayed with caustic from line 5 to remove trace amounts of HCl and residual chlorine as NaOCl, then they are vented through line 6.

The solution of chlorine gas, and small amounts of the other gases, in HCl passes through line 7 to electrochemical chlorine concentrator 8, where it is electrolyzed. The cathodic reaction is the chlorine ionization reaction:

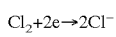

while the anodic reaction is the discharge of the $Cl^-$ ions to form $Cl_2$:

The chlorine gas that forms at the anode passes through line 9 to gas/liquid separator 10 then leaves through line 11. Hydrochloric acid from separator 10 is recycled to chlorine absorber 2 via line 12.

In a second embodiment, chlorine absorber 2 is eliminated and chlorine in line 1 goes directly into concentrator 8, which is fitted with a gas diffusion type electrode instead of a porous flow-through electrode. In a gas diffusion electrode, the gas directly (without the pre-dissolution step) reacts at the three-phase boundary of electrode-gas-liquid to yield chloride. The advantage of this procedure is the elimination of the gas dissolution step and fewer pumping costs.

In a third embodiment, concentrator 8 is constructed with a classical gas diffusion electrode. The chlorine gas is sent through the gas chamber of the cathode, whereby the chlorine diffuses into the porous electrode structure and is reduced at the cathode. The catholyte compartment is separated from the anolyte compartment by an ion exchange membrane. The catholyte is 0.1 to 10 N HCl which becomes concentrated as the reaction proceeds. The operating concentration of the HCl can be about 1N to about 10N. The catholyte stream is externally routed to the anolyte compartment, where chlorine is generated from the HCl. The resulting weak HCl is recirculated into the catholyte compartment to enable the continued reduction of chlorine gas. The chlorine gas generated acts as a bubble pump, pulling new electrolyte into the catholyte compartment; however, a pump can be added if necessary.

Alternatively, using the gas diffusion electrode, the membrane or separator can serve to prevent the mixing of the anolyte and the catholyte. The catholyte, which passes through the anode compartment to release chlorine, can be concentrated to greater than the starting concentration, a function of the operating variables. Spent HCl goes to a reservoir, where it is enriched with chlorine gas. The chlorine-enriched HCl passes through the porous electrode in the cathode compartment of the cell.

As still another alternative, the cell can be fitted with a porous gas diffusion type electrode. The cathode has a gas chamber through which the gas stream passes. The rest of the setup is very similar to the hereinabove description, except that the HCl in the reservoir is not enriched with chlorine gas.

The catalyst on the anode and cathode can be made of a variety of materials known in the art. Examples of anode catalysts include C, $RuO_2+TiO_2$, $RuO_2+IrO_2$, $RuO_2+TiO_2+IrO_2$, and mixtures thereof, coated on a Ti substrate by a thermal decomposition technique. The cathode catalyst can be, for example, Pt, Ru, a Pt—Ru alloy, Ir, Rh, $RuO_x$, or Pt doped $RuO_x$, either as pure metal black or supported on carbon or graphite, or Pt—Ru, $RuO_x$, or Pt coatings on porous titanium. The loading of the cathode catalyst can be about 0.1 to about 10 $g/m^2$.

The operating temperature of the electrochemical cell is typically about 25 to about 100° C., but the preferred temperature range is about 40 to about 50° C. The operating pressure can be about one atmosphere up to the pressure of the tail gas.

This invention is applicable to mixtures of gases containing about 1 to about 99 wt % chlorine gas and is particularly applicable to mixtures of gases containing about 5 to about 50 wt % chlorine gas. Various other gases can be present in the mixture, the most common gases being $H_2$, $N_2$, $O_2$, and $CO_2$. The mixture should not contain a gas that electrolyzes with the chlorine to form a gas that cannot be easily separated from chlorine. Nitrogen and carbon dioxide in the gas mixture are not reducible at the cathode. Oxygen is reducible under the experimental conditions; however, its exchange current density is eight orders of magnitude less than that of chlorine. Oxygen's solubility in HCl is also orders of magnitude lower than that of chlorine, which further helps to reduce any reduction of oxygen and, when the acid concentration is in excess of 1.4M, oxygen evolution is inhibited at the anode.

This invention is particularly well-suited for treating tail gases from chlor-alkali plants. A typical composition for a diaphragm cell chlorine tail gas at liquefaction efficiencies of 95% and 99.9% is given in the following table:

| Liquefaction Efficiency (%) | $Cl_2$ (%) | $H_2$ (%) | $N_2$ (%) | $O_2$ (%) | $CO_2$ (%) |
|---|---|---|---|---|---|
| 95.0 | 44.18 | 1.86 | 16.70 | 27.96 | 9.30 |
| 99.9 | 1.55 | 3.28 | 29.53 | 49.22 | 16.42 |

EXAMPLE 1

The chlorine gas composition of the tail gas depends upon the chlorine liquefaction process design. The chlorine concentration may be as much as 45 vol % and as low as 2 vol %. Hence, the chlorine solubility in the solvents will be substantially different as the gas solubility directly depends upon the partial pressure of the dissolving gas. The following is an outline of an approach taken for designing a system to dissolve chlorine in 7.8 N HCl solution at 30° C. The dissolution of tail gas in acid separates chlorine from undesirable gases. The dissolved HCl solution is then electrolyzed to produce chlorine.

A typical tail gas composition with 95% chlorine liquefaction efficiency is as follows:

| Component | Vol % |
|---|---|
| Chlorine | 44.0 |
| Carbon Dioxide | 16.5 |
| Hydrogen | 2.0 |
| Oxygen | 28.0 |
| Nitrogen | 17.0 |

The tail gas is typically at 35 psig. However, the chlorine dissolver will be at ambient pressure with about 10 feet solvent depth. The design should be such that there will be about 2.0 psig tail gas pressure in the chlorine dissolver above the dissolving gas.

The chlorine partial pressure will be 0.44×(14.7+2.0)/14.7= 0.5 ATM.

The solubility of chlorine with 0.5 ATM is 0.04 mol/liter. For a 2 tons/day (tpd) chlorine recovery, the chlorine flow will be 17.7 moles/min.

Since the chlorine solubility, at 30° C., in 7.8 N HCl is 0.04 moles/liter, the flow to cells will be ~117 gals/min (gpm). Generally, industrial electrolytic chlorine cells are designed to operate at 0.6 gal/min/m². At the design factor, 195 cells are required to handle 117 gal/min flow. However, the cost of these cells can be significantly reduced by modifying the existing cells with large orifices for the electrolyte flow to achieve the 8 to 10 gpm flow, which will reduce the total number of cells required to handle the streams at a chlorine recovery rate of 2 tons per day (tpd).

EXAMPLE 2

Figure 2:
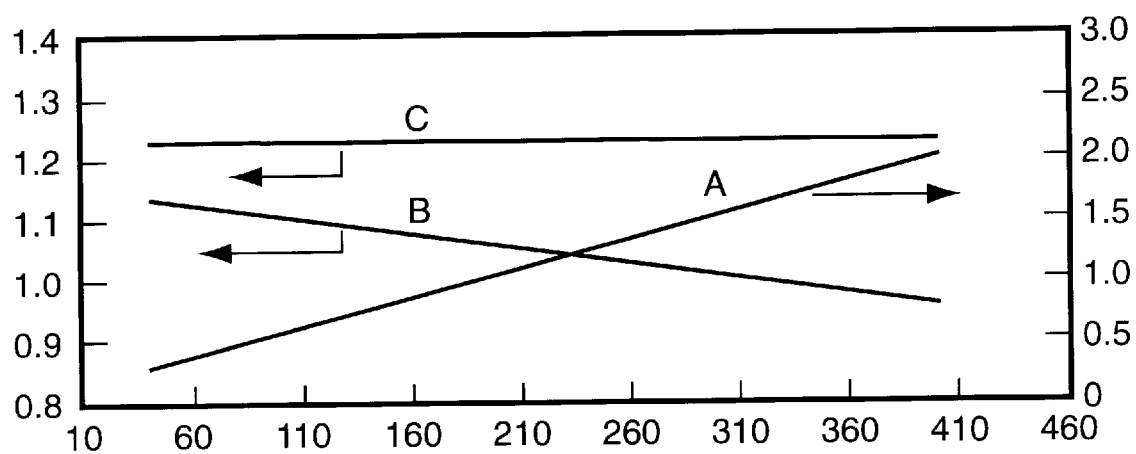
FIG. 2 is a graph showing the results of Example 2, where the abscissa is current density ($mA/cm^2$) and the ordinate is iR corrected potential (volts)/cell voltage (volts).

The reactor used in this example consisted of a graphite cathode block, a titanium anode block, and catholyte and anolyte chambers made of polyphenylene oxide. Ag/AgCl reference electrodes were placed in the center of the anolyte and catholyte chambers. The reactor was assembled with a gas diffusion electrode as cathode, a ruthenium oxide-coated titanium-expanded mesh anode and a perfluorosulfonic membrane (sold by Dupont as "Nafion 117") in between the catholyte and anolyte chambers. Gaskets made of fluorinated elastomeric materials(e.g., "Viton," sold by McMaster Carr, New York) were inserted in between the various components to prevent leakage. The electrolyte chambers were equipped with an inlet and an outlet to facilitate electrolyte circulation. The gas diffusion electrode for this example was made with a Pt—Ru (1:1 mole ratio) catalyst. Anolyte and catholyte chambers were connected internally (or through an external connection). The electrolyte was pumped to the cathode first, and then circulated around the anode before exiting. Impure chlorine gas (50 wt % chlorine and the remainder a mixture of nitrogen, carbon dioxide, and oxygen) was fed to the gas diffusion electrode through the cathode block. The electrolyte was 6M HCl. FIG. 2 shows the observed terminal cell voltage (A), cathode (B) and anode (C) potentials (IR corrected) recorded as a function of current density. As can be seen from the FIG. 2, the major contribution to the cell voltage arose from the cell internal resistance. The over potential contributions accounted for only ~0.25V at 400 $mA/cm^2$. Thus, these improvements to the cell design resulted in a very energy efficient process.

EXAMPLE 3

Figure 3:
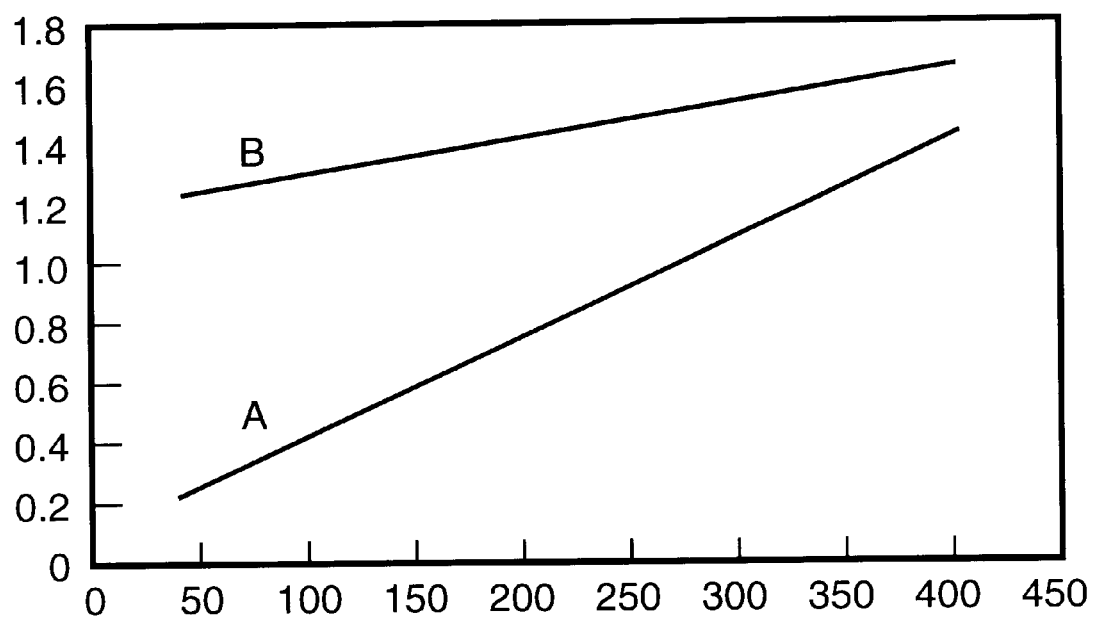
FIG. 3 is a graph showing the results of Example 3, where the abscissa is current density ($mA/cm^2$) and the ordinate is cell voltage (volts).

The impure chlorine stream used in Example 2 was first dissolved in 6M HCl to obtain a chlorine-saturated HCl electrolyte. Only chlorine dissolved in the electrolyte and all the other impurities were vented out. This electrolyte was pumped through a porous graphite or titanium electrode, coated with Pt—Ru catalyst. Chlorine gas was reduced to chloride at the catalyst surface. The catholyte, depleted of chlorine, was passed through the anode compartment, where the chloride was oxidized back to pure chlorine gas. The outlet of the anode was sent to a gas-liquid separator to recover the chlorine gas and to recycle the spent electrolyte. FIG. 3 shows the results obtained in this mode. The dominant contribution to the cell voltage (A) arose from the cell internal resistance. The current-voltage curve (B) was very similar to the gas diffusion mode of operation shown in FIG. 2. Therefore, it is possible to employ either mode to obtain the best possible cell design.

EXAMPLE 4

Figure 4:
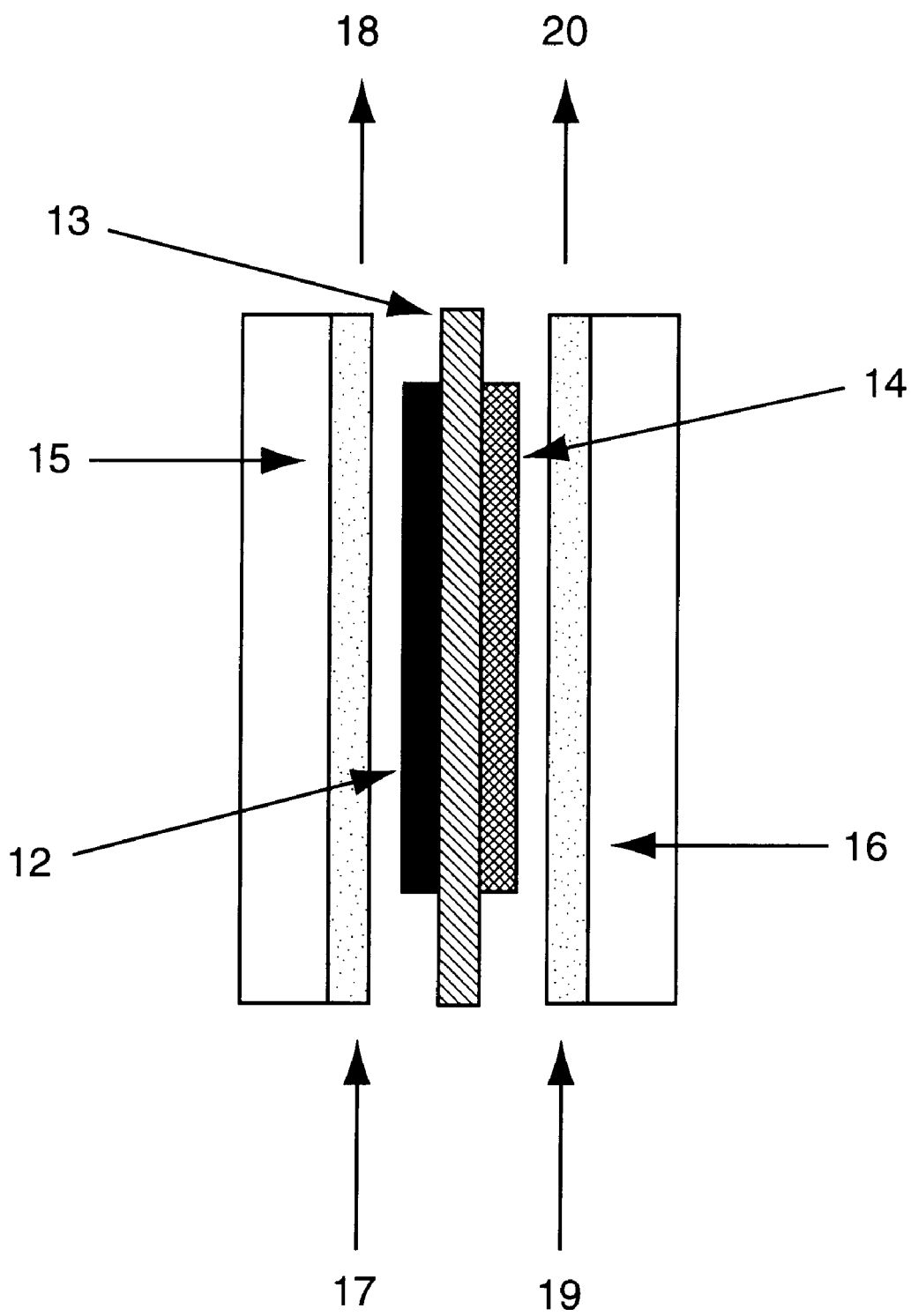
FIG. 4 is a side view schematic drawing illustrating a portion of the apparatus used in Example 4.

The purification of impure chlorine stream can also be accomplished by the use of a membrane electrode assembly made with an anion exchange membrane. In this embodiment (see FIG. 4), a gas diffusion electrode 12 (made with one or more of the hereinabove-listed catalysts) is bonded to one side of the anion exchange membrane 13 under elevated temperature and pressure. The anode 14, which may be an expanded metal titanium screen coated with one or more of the hereinabove-listed anode catalysts, is placed on the other side of the anion exchange membrane. The membrane electrode assembly is held in place using appropriate cell end plates 15 and 16. A monopolar or bipolar construction is possible with this arrangement. The impure chlorine gas is fed to the cathode side 17 and the depleted gas stream exits at 18. Hydrochloric acid in the desired concentration range (see above) is fed to the anode side 19. At the cathode, chlorine ionizes to form chloride, which migrates through the anion exchange membrane to the anode side, where chloride is discharged to form pure chlorine which exits through 20, mixed with HCl. In this embodiment, the membrane, which is a polymeric, non-porous sheet, has very low permeability to gaseous species. Therefore, the impurity gases in the inlet stream do not reach the anode side, and the pure chlorine gas evolved at the anode does not permeate to the cathode side either. This method avoids the gas dissolution step of Example 3, and the external circulation step of Example 2. The bonding of the cathode gas diffusion electrode to the membrane provides a superior bubble pressure to the assembly. The proximity of the electrodes to the ionically-conducting anion exchange membrane reduces the cell resistance significantly, which results in significant power savings.

We claim:

1. A process for separating chlorine gas from a mixture with other gases comprising
   (A) electrolyzing said chlorine gas to form chloride ion;
   (B) separating said chloride ion from said mixture of gases; and
   (C) electrolyzing said chloride ion to form chlorine gas at the anode.

2. A process according to claim 1 wherein said mixture is the tail gas from a chlor-alkali plant.

3. A process according to claim 2 wherein the operating pressure is one atmosphere up to the pressure of said tail gas.

4. A process according to claim 1 wherein said electrolyzing is at about 25 to about 100° C.

5. A process according to claim 1 wherein said mixture of gases is sparged into hydrochloric acid, which dissolves chlorine gas in said mixture of gases, the undissolved gases in said mixture are separated from said hydrochloric acid, and said hydrochloric acid is fed to an electrochemical cell having a catalyzed cathode and a catalyzed anode.

6. A process according to claim 5 wherein said cathode catalyst is selected from the group consisting of Pt, Ru, a Pt—Ru alloy, Ir, Rh, $RuO_x$, and Pt doped $RuO_x$, either as pure metal black or supported on carbon or graphite, and Pt—Ru, $RuO_x$, and Pt coatings on porous titanium and said anode catalyst is selected from the group consisting of C, $RuO_2+TiO_2$, $RuO_2+IrO_2$, $RuO_2+TiO_2+IrO_2$, and mixtures thereof, coated on a Ti substrate by a thermal decomposition technique.

7. A process according to claim 5 wherein the loading of said cathode catalyst is about 0.1 to about 10 $g/m^2$ and the loading of said anode catalyst is about 0.1 to about 10 $g/m^2$.

8. A process according to claim 5 wherein the operating concentration of said HCl is 1N to 10N.

9. A process according to claim 1 wherein said mixture of gases is fed directly into the cathode side of a solid polymer electrolyte based anionic exchange membrane coated on one side with a porous cathode catalyst and the other side with a porous anode catalyst.

10. A process according to claim 9 wherein said cathode catalyst is selected from the group consisting of Pt, Ru, a Pt—Ru alloy, Ir, Rh, $RuO_x$, and Pt doped $RuO_x$, either as pure metal black or supported on carbon or graphite, and Pt—Ru, $RuO_x$, and Pt coatings on porous titanium and said anode catalyst is selected from the group consisting of C, $RuO_2+TiO_2$, $RuO_2+IrO_2$, $RuO_2+TiO_2+IrO_2$, and mixtures thereof, coated on a Ti substrate by a thermal decomposition technique.

11. A process according to claim 9 wherein the loading of said cathode catalyst is about 0.1 to about 10 $g/m^2$ and the loading of said anode catalyst is about 0.1 to about 10 $g/m^2$.

12. A process according to claim 1 wherein said mixture of gases is fed directly into a porous gas diffusion cathode having a cathode catalyst and a catalyzed anode, separated by a cation exchange membrane.

13. A process according to claim 12 wherein said cathode catalyst is selected from the group consisting of Pt, Ru, a Pt—Ru alloy, Ir, Rh, $RuO_x$, and Pt doped $RuO_x$, either as pure metal black or supported on carbon or graphite, and Pt—Ru, $RuO_x$, and Pt coatings on porous titanium and said anode catalyst is selected from the group consisting of C, $RuO_2+TiO_2$, $RuO_2+IrO_2$, $RuO_2+TiO_2+IrO_2$, and mixtures thereof, coated on a Ti substrate by a thermal decomposition technique.

14. A process according to claim 12 wherein the loading of said cathode catalyst is about 0.1 to about 10 $g/m^2$ and the loading of said anode catalyst is about 0.1 to about 10 $g/m^2$.

15. A process for separating chlorine gas from a tail gas containing about 1 to about 99 wt % chlorine comprising
   (A) passing said tail gas into 1 to 10 N hydrochloric acid, whereby chlorine gas in said tail gas dissolves in said hydrochloric acid, forming a solution;
   (B) separating said solution from said tail gas; and
   (C) electrolyzing said solution in an electrolytic cell having a cathode catalyst selected from the group consisting of Pt, Ru, a Pt—Ru alloy, Ir, Rh, $RuO_x$, and Pt doped $RuO_x$, either as pure metal black or supported on carbon or graphite, and Pt—Ru, $RuO_x$, and Pt coatings on porous titanium and an anode catalyst selected from the group consisting of C, $RuO_2+TiO_2$, $RuO_{x2}+IrO_2$, $RuO_2+TiO_2+IrO_2$, and mixtures thereof, coated on a Ti substrate by a thermal decomposition technique, whereby chlorine gas is discharged at the anode.

16. A process according to claim 15 wherein said electrolyzing is at about 25 to about 100° C.

17. A process according to claim 15 wherein the loading of said cathode catalyst is about 0.1 to about 10 $g/m^2$.

18. A process according to claim 15 wherein the operating concentration of said HCl is 1N to 10N.

19. A process according to claim 15 wherein the operating pressure is one atmosphere up to the pressure of said tail gas.

20. Apparatus for separating chlorine gas from a mixture with other gases comprising (A) an electrolytic cell having (1) a cathode; and (2) an anode;

(B) a mixture of gases including chlorine at said cathode, whereby chlorine is reduced to chloride ions at said cathode; and (C) means permitting the transport of said chloride ions to said anode, whereby said chloride ions are oxidized to chlorine gas.

* * * * *